June 23, 1925.  
H. B. SHERMAN  
BATTERY CLIP  
Filed April 24, 1924  
1,543,524  
2 Sheets-Sheet 2
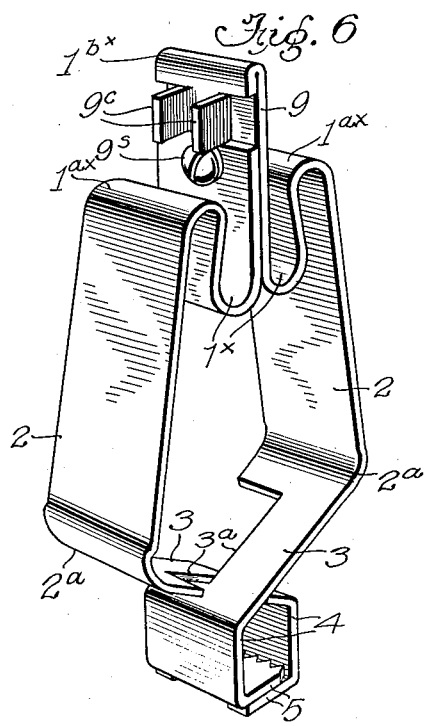
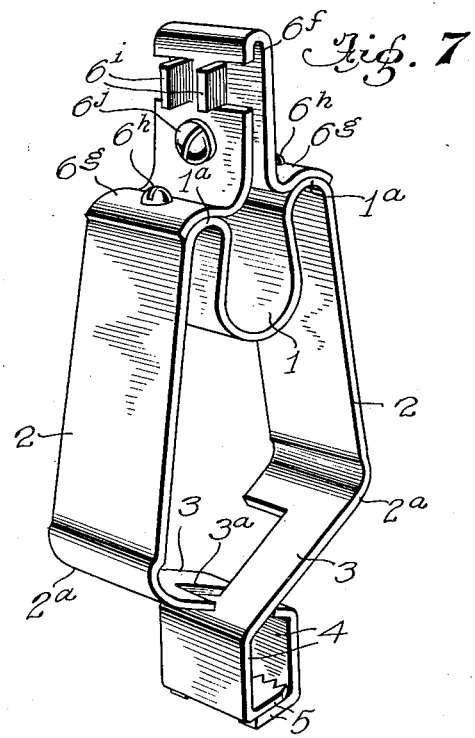
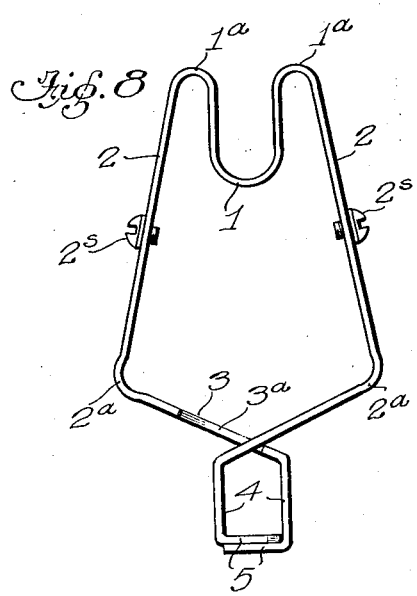
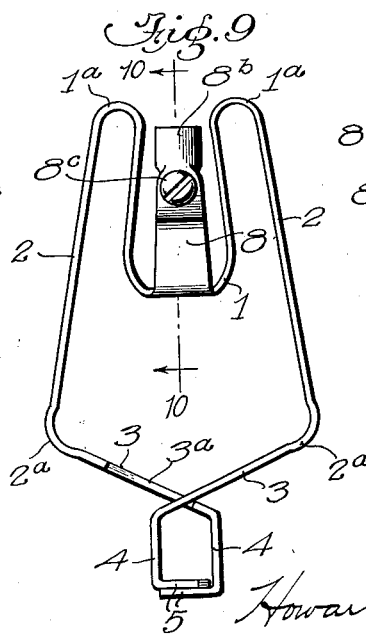
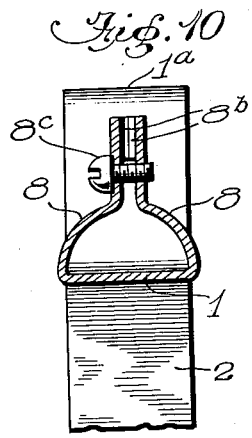
Inventor  
Howard B. Sherman  
By Alexander & Farr  
Attorneys Patented June 23, 1925.

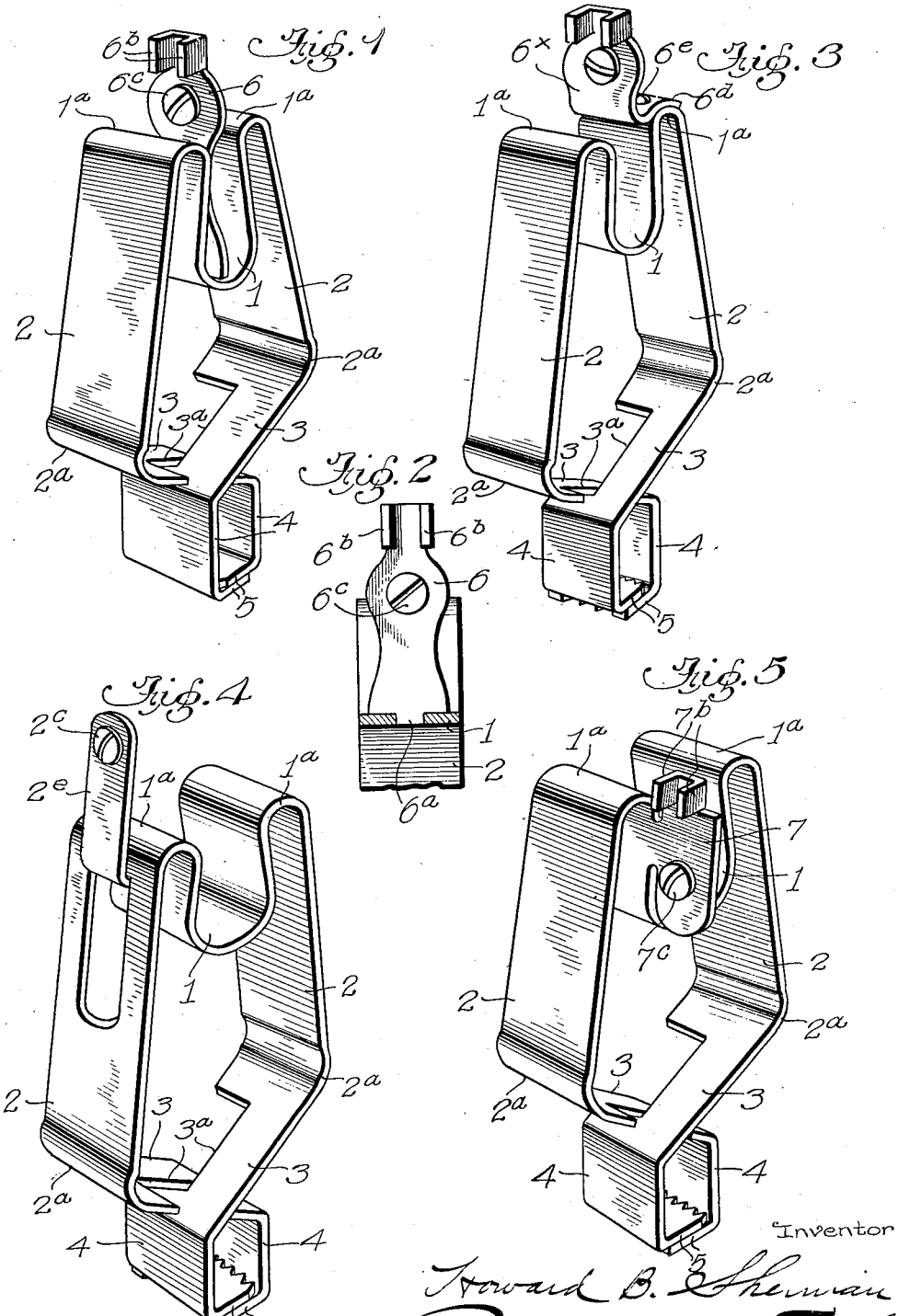

1,543,524

UNITED STATES PATENT OFFICE.

HOWARD B. SHERMAN, OF BATTLE CREEK, MICHIGAN.

BATTERY CLIP.

Application filed April 24, 1924. Serial No. 708,774.

*To all whom it may concern:*

Be it known that I, HOWARD B. SHERMAN, a citizen of the United States, residing at Battle Creek, in the county of Calhoun and State of Michigan, have invented certain new and useful Improvements in Battery Clips; and I hereby declare that the following is a full, clear, and exact description thereof, reference being had to the accompanying drawings, which form part of this specification.

This invention relates to battery clips or test clips for use with electric batteries and the like, and its object is to provide a simple spring clip which will be very efficient in operation, and can be economically manufactured. In the accompanying drawings I have illustrated spring clips embodying the invention with various modifications of the means for connecting the conductor to the clip.

I will explain the invention with reference to said drawings, and refer to the claims for summaries of the invention for which protection is desired.

In said drawings:

Figure 1 is a perspective view of my novel clip with the at present, preferred form of "connector" or means for connecting a conductor thereto.

Fig. 2 is a detail section of the clip showing the means for attaching the connector shown in Figure 1.

Figures 3, 4, and 5 are perspective views of the novel clip, shown in Figure 1, but with various forms of the connector, or devices for attaching the conductor thereto.

Figure 6 is a perspective view of a somewhat modified form of the clip having another variation in the form of connector.

Figure 7 is a view of the clip as shown in Figure 1, with still another variation of the connector.

Figure 8 is a front view of the clip shown in Figure 1, with a simple means of attaching the conductor thereto.

Figure 9 is a view of a clip with a modified construction of the connector.

Figure 10 is a detail section on the line 10—10, Figure 9.

As shown in Figures 1, 2, 4, 5, 7, 8, and 9 of the drawings each complete clip is formed integrally of a single strip of suitable spring metal bent centrally upon itself to form a central inverted loop 1, and opposite side members 2, 2, the upper ends of which are integrally connected with and merged by bends 1ª into the upper ends of the adjacent ends of loop 1 and the lower ends of the members 2 are connected with and merged, by bends 2ª, into legs 3 which extend toward and intersect each other at approximately 45 degrees to the related members 2, said legs lying at right angles to each other and crossing each other as shown. The legs 3 have long notches 3ª in their opposed edges, where they intersect so that the legs 3 lie in the same plane with the loop 1 and the members 2. At the outer ends of the legs 3 the portions of the strap are bent downwardly, at approximately an angle of 45 degrees to the legs to form opposed parallel jaws 4, and the lower end of each jaw 4 is bent inward at about right angles as shown at 5, said parts 5 being preferably serrated on their opposed edges and adapted to bite a binding post, or any other electrical conductor, which may be inserted between them.

The opposed jaws may be separated or opened, by pressing the members 2 toward each other, but will be closed when pressure on the members 2 is released, by the action of the triple spring formed by the loop 1 and the bends 1ª merging and connecting the free ends of loop 1 with the upper ends of the members 2.

It will be seen that each clip is integrally formed of a single strip of metal bent as shown and described. The loop 1 and connected merging parts of the loop and members 2 together form an approximately W or M shaped spring, having four sides and 3 loops, and this peculiar spring is an essential feature of each of the clips shown in Figures 1, 3, 4, 5, 7, 8, and 9 of the drawings. The efficiency and resiliency of the clip is greatly enhanced by such peculiar integral spring formation.

The peculiar spring formation is at the end of the clip opposite the jaws. If the central loop 1 of the spring is enlarged and extended downward toward the clamping jaws the tension would be increased. If this central loop is reduced in diameter, or in other words, if the pivotal point is removed further from the jaws the leverage is changed and the spring tension would be diminished.

The clips may be connected with the electrical conductor in any suitable manner.

Preferably I employ the construction shown in Figures 1 and 2. In this case a connector 6 is stamped out of metal and is inserted between the legs of the loop 1 and projects somewhat above the loop. The inner end of the connector is riveted to the bend of the loop 1, as at 6ª, and the upper end of this connector is provided with opposite lugs 6ᵇ which can be closed together around the conductor (not shown) and the end of such conductor may be fastened to the connector by a screw 6ᶜ.

In Figure 3 the connector is shown as formed of a strip of metal 6ˣ, somewhat similar to connector 6, but instead of being connected to the bend of the loop 1, the lower end of the conector 6ˣ is curved at 6ᵈ to fit onto one of the bends 1ª, and is secured thereto by a rivet 6ᵉ.

In Figure 4 the connector is shown as formed by partially severing a tongue 2ᵉ from one of the members 2, adjacent loop 1ª, and the conductor may be connected to the tongue 2ᵉ by a screw 2ᶜ. The tongue might be formed at any other suitable part of the connector.

In Figure 5 the clip is shown as provided with an integral lug 7, preferably extending from one edge of one of the members to the loop 1, provided at its upper end with opposite lugs 7ᵇ adapted to be closed around the conductor, not shown, and the end of the conductor can be fastened to the lug 7 by a screw 7ᶜ.

In Figure 7 the connector is formed of a strip of metal bent upon itself to form a tang 6ᶠ, and its opposite ends are flared outwardly as at 6ᵍ, and fastened to the bends 1ª of the clip by screws 6ʰ. One side of the tang 6ᶠ may be provided with opposed struck-up lugs 6ⁱ, adapted to be closed around the conductor, and the conductor may be fastened to one side of the tang 6ᶠ by a screw 6ʲ. In this construction the connector 6ᶠ reinforces and augments the resiliency of the loop 1.

In the construction indicated in Figure 8 the conductor may be attached directly to the members 2 of the clip by means of screws 2ˢ.

In the construction shown in Figure 9 the connector may be formed by preferably integral lugs 8 projecting from opposite sides of the central portion of the loop 1, said lugs being bent inwardly and provided with concaved portions 8ᵇ, near their free ends, adapted to be closed upon the conductor, and fastened together and to the conductor by a clamping screw 8ᶜ.

In the construction shown in Figure 6 instead of a single loop 1 a double loop 1ˣ, 1ˣ, is formed by first doubling the strip of metal upon itself to form a shank 9 between the inner sides of the two loops 1ˣ, 1ˣ, the inner sides of which closely abut, and the free outer end of each loop 1ˣ is connected and merged by a bend lax into the adjacent member 2 of the clip. The shank 9 preferably extends above the bends lax, and a pair of lugs 9ᶜ may be struck out of the metal of the clip at one side of the shank 9 and adapted to be closed around a conductor, (not shown) which can be further attached to the shank by a screw 9ˢ. The clip shown in Figure 6, like the others, is formed integrally from a single strip of suitable metal of proper length and width; and the double loops 1ˣ, 1ˣ enhance the stiffness and resciliency of the clip.

Preferably the bends 2ª are so formed as to project slightly beyond the outer surface of the members 2 at the lower ends thereof, the projecting parts of the bends forming what might be termed transverse ribs which prevent the operator's fingers slipping off the ends of the members in applying the clip.

I claim:

1. A battery clip formed of a single strip of suitable metal bent at its center to form a plurality of substantially side by side bends and opposite similar side members extending beyond the central bend; and beyond said side members the opposite portions of the strip being bent inwardly at a point beyond the central bend to form opposite legs, said legs crossing each other; the portions of the strip being further bent at the outer ends of the legs to form opposed clamping jaws; said jaws being at the end of the clip opposite the plurality of bends, and the said bends constituting a spring adapted to spread the side members apart and close the jaws; all portions of such clip being formed integral, substantially as and for the purpose specified.

2. A battery clip formed of a single strip of suitable metal bent at its center to form a central inwardly extending loop and at the outer ends of said loop being bent outwardly and merging into opposite similar side members extending beyond the central loop, the loop and bends constituting an approximately W-shaped spring adapted to spread the side members apart; the opposite portions of the strip beyond the said side members being bent inwardly toward each other at a point beyond the loop to form opposite legs, said legs crossing each other; and extremities of the strip being bent at the outer end of each leg to form opposed clamping jaws; said jaws being at the end of the clip opposite the W-shaped spring portion, and all parts of such clip being formed integral, substantially as and for the purpose specified.

3. A clip as set forth in claim 1 having bends at the lower ends of the side members projecting outwardly beyond the outer surface of said side members to form ribs to prevent the fingers slipping off the ends of said members.

4. A clip as set forth in claim 2 having the bends at the lower ends of the side members projecting outwardly beyond the outer surface of said side members to form ribs to prevent the fingers slipping off the ends of said members.

5. A battery clip formed of a single flat strip of metal bent at its center to form a plurality of substantially side by side bends, and having opposite similar side members extending beyond the central bend, said side members being bent inwardly at a point beyond the central bend to form opposite legs, said legs crossing each other; the ends of the legs being bent to form opposed clamping jaws, the said bends constituting a spring adapted to spread the side members apart to close the jaws; and a substantially L-shaped connector riveted to the outer end of one of said bends adjacent one side member.

6. In a clip as set forth in claim 5, the side members adjacent said legs being bent outwardly to form ribs to prevent the fingers slipping off the said members.

In testimony that I claim the foregoing as my own, I affix my signature.

HOWARD B. SHERMAN.